Nov. 24, 1925.
A. RASMUSSEN
1,563,291
LISTER CULTIVATOR SHIELD ATTACHMENT
Filed Oct. 29, 1924    2 Sheets-Sheet 1
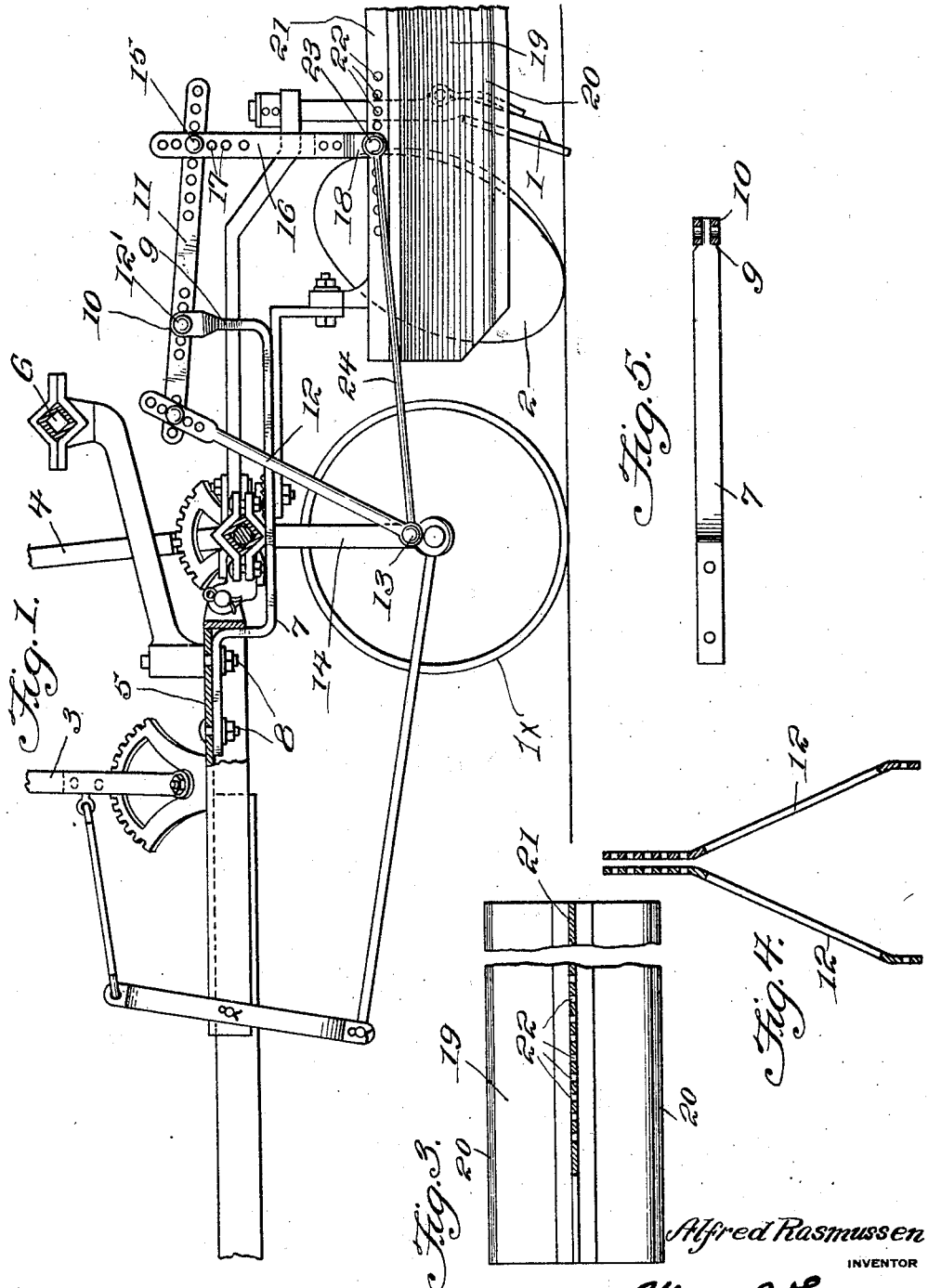
Alfred Rasmussen
INVENTOR
BY Victor J. Evans
ATTORNEY
WITNESS: G.T.L. Wright Nov. 24, 1925.  1,563,291
A. RASMUSSEN
LISTER CULTIVATOR SHIELD ATTACHMENT
Filed Oct. 29, 1924  2 Sheets-Sheet 2
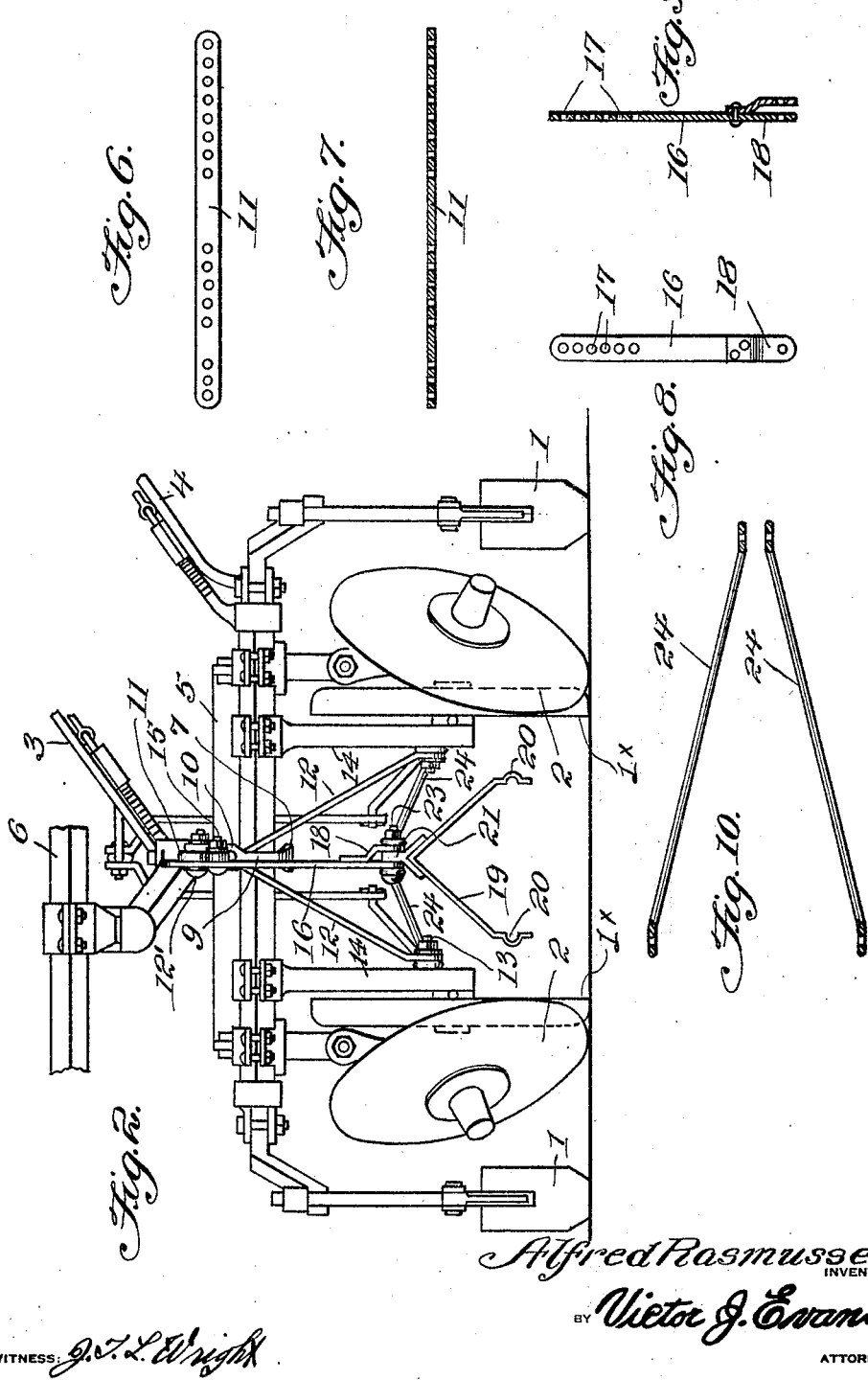

Patented Nov. 24, 1925.

1,563,291

UNITED STATES PATENT OFFICE.

ALFRED RASMUSSEN, OF PLAINVIEW, NEBRASKA, ASSIGNOR OF ONE-HALF TO SABURO SHINDO, OF GRAND ISLAND, NEBRASKA.

LISTER-CULTIVATOR SHIELD ATTACHMENT.

Application filed October 29, 1924. Serial No. 746,590.

*To all whom it may concern:*

Be it known that I, ALFRED RASMUSSEN, a citizen of the United States, residing at Plainview, in the county of Pierce, and State of Nebraska, have invented new and useful Improvements in Lister-Cultivator Shield Attachments, of which the following is a specification.

My present invention pertains to lister cultivators, and contemplates the provision of an attachment for such cultivators embodying a shield and means connected with the cultivator and the shield whereby the shield will be automatically adjusted relative to the surface of the ground in concert with the adjustment of the disks of the cultivator relative to said surface.

To the attainment of the foregoing, the invention consists in the improvement as hereinafter described and definitely claimed.

In the accompanying drawings, forming part of this specification:—

Figure 1 is a view, partly in longitudinal section and partly in side elevation, showing a lister equipped with my improvement.

Figure 2 is a rear elevation of the same.

Figure 3 is a top plan view of the shield embraced in my improvement.

Figure 4 comprises disconnected views of the forward supports of my improvement.

Figure 5 is a top plan view of the lever support of the improvement.

Figure 6 is a side elevation of the apertured lever comprised in my improvement.

Figure 7 is a longitudinal section of the lever.

Figures 8 and 9 are projected views of the hanger interposed between the shield and the rear arm of the lever, Figure 9 being a vertical section.

Figure 10 shows disconnected plan views of the connecting rods between the cultivator frame, on the one hand, and the connected shield and hanger, on the other.

Similar numerals of reference designate corresponding parts in all of the views of the drawings.

The lister cultivator illustrated includes plows 1 ground wheels 1<sup>x</sup> and lister disks 2 together with a lever 3 for use in adjusting and adjustably fixing the disks 2 and a lever 4 for adjusting and adjustably fixing the plows or shovels 1. The frame of the cultivator is designated by 5, and the cultivator is designed to be connected in conventional manner and by transverse bar 6 with another cultivator in spaced and parallel relation to the cultivator illustrated.

In furtherance of my invention a longitudinal bar 7 is fixedly connected at 8 to the cultivator frame and is provided at its rear end with an upstanding arm 9, the upper end 10 of which is bifurcated to receive a lever 11 and the fulcrum pin 12 of the said lever. The said lever 11 is provided with groups of apertures for adjustment purposes and its forward arm is connected to the upper portions of downwardly divergent bars 12 which are connected through the medium of pins 13 to pendent portions 14 of the cultivator that carry the before mentioned wheels 1<sup>x</sup>.

Connected by a pin 15 to the rear arm of the lever 11 is a hanger 16 having a group of apertures 17 for adjustment purposes and provided at its lower end with a bifurcated and apertured portion 18.

The shield 19 of my improvement is preferably formed of sheet metal in the shape shown in Figures 2 and 3 and is ribbed at 20 to give it increased stiffness and strength. Superimposed on and fixed to the apex of the shield 19 is a crown base 21 of appropriate metal in which is a series of apertures 22 for adjustment purposes, a pin 23 passes through the said crown base 21 of the shield 19 and also through the portion 18 of the hanger 16 to connect the shield and the hanger and the said pin or bolt 23 also serves for the connection of the rear ends of divergent rods 24, the forward ends of which are connected to the supports 12 and the cultivator portions 14 by the before mentioned pins 13.

It will be apparent from the structure disclosed in the foregoing that when the lever 3 is moved rearwardly to lower the disks 2, the shield 19 will be raised, and when the lever 3 is moved in the opposite direction to raise the disks 2 the shield will be lowered. From this it follows that irrespective of the positioning of the disks 2 of the cultivator relative to the surface of the ground the shield 19 will be accurately positioned to perform the usual function of such shields.

It will also be manifest from the foregoing that my improvement is simple, inexpensive and durable and is susceptible of ready application to lister cultivators such as at present in general use.

While designed primarily for application to existing lister cultivators, my improvement may be obviously embodied in cultivators at the time of manufacture without affecting my claimed invention.

I have specifically described the preferred embodiment of my invention in order to impart an exact understanding of said embodiment in all of its details. I do not desire, however, to be understood as confining myself to the construction shown and described, my invention being defined by my appended claims within the scope of which changes may be made without affecting my invention.

Having described my invention, what I claim and desire to secure by Letters-Patent, is:—

1. A lister cultivator having a frame and lister disks and swinging portions carrying the disks and also having means for adjusting and adjustably fixing said swinging portions, in combination with a support connected to said frame, a longitudinal vertically swinging lever fulcrumed at an intermediate point of its length on said support, means connected to and extending between the said swinging portions and the forward arm of the said lever, a hanger connected to the rear arm of said lever, a shield connected to and suspended by said hanger, and means extending between and connecting the connected shield and hanger and the said swinging portions of the cultivator.

2. A lister cultivator having a frame and lister disks and swinging portions carrying the disks and also having means for adjusting and adjustably fixing said swinging portions, in combination with a support connected to said frame, a longitudinal vertically swinging lever fulcrumed at an intermediate point of its length on said support, means connected to and extending between the said swinging portions and the forward arm of the said lever, a hanger connected to the rear arm of said lever, a shield connected to and suspended by said hanger, and means extending between and connecting the connected shield and hanger and the said swinging portions of the cultivator; the said shield having a crown base and a group of apertures therein, and groups of apertures being also provided in the lever, the hanger and the means connecting the forward arm of the lever and the swinging portions of the cultivator.

3. A lister cultivator attachment comprising a lever, a support for the lever at an intermediate point in the length of the latter, a hanger connected to the rear arm of the lever, a shield connected to said hanger, bars connected to the forward arm of the lever and adapted to be connected with the swinging disk carrying portions of a lister cultivator, and rods extending between and connected to the connected shield and hanger and the lower portions of the said bars.

4. A lister cultivator attachment comprising a lever, a support for the lever at an intermediate point in the length of the latter, a hanger connected to the rear arm of the lever, a shield connected to said hanger, bars connected to the forward arm of the lever and adapted to be connected with the swinging disk carrying portions of a lister cultivator, and rods extending between and connected to the connected shield and hanger and the lower portions of the said bars; the said lister being provided with a longitudinal crown base on its apex, and the said hanger being provided with a bifurcated portion arranged in straddling relation to said crown base.

In testimony whereof I affix my signature.

ALFRED RASMUSSEN.